United States Patent
Samant et al.

[11] Patent Number: 5,427,603
[45] Date of Patent: Jun. 27, 1995

[54] METHOD OF TREATING A VANADIUM-CONTAINING RESIDUE

[75] Inventors: Gurudas Samant, Fronhausen; Christopher Higman, Schwalbach; Venkita Krishnan, Neu-Isenburg; Peter Sturm, Karben, all of Germany

[73] Assignees: Metallgesellschaft Aktiengesellschaft, Frankfurt, Germany; Norsk Hydro Technology A.S., Oslo, Norway

[21] Appl. No.: 974,403

[22] Filed: Nov. 12, 1993

[30] Foreign Application Priority Data

Nov. 13, 1991 [DE] Germany .................. 41 37 320.0
Apr. 23, 1992 [DE] Germany .................. 42 13 328.9

[51] Int. Cl.⁶ ............................................. C01G 31/00
[52] U.S. Cl. ............................. 75/622; 423/592; 423/62
[58] Field of Search ............... 75/622; 423/62, 592

[56] References Cited

U.S. PATENT DOCUMENTS

| | | | |
|---|---|---|---|
| 2,769,687 | 11/1956 | Porter et al. | 423/62 |
| 3,753,681 | 8/1973 | Vojkovic | 75/758 |
| 4,035,476 | 7/1977 | Ilmaier et al. | 423/592 |
| 4,203,759 | 5/1980 | Metrailer et al. | 75/363 |
| 4,389,378 | 6/1983 | McCorrister | 423/68 |
| 4,420,464 | 12/1983 | Barclay | 423/65 |
| 4,443,415 | 4/1984 | Queneau et al. | 423/68 |
| 4,477,416 | 10/1984 | Goddard | 423/67 |
| 4,486,400 | 12/1984 | Riley | 423/592 |
| 4,536,374 | 8/1985 | McCorriston | 423/68 |
| 4,645,651 | 2/1987 | Hahn et al. | 423/62 |
| 4,816,236 | 3/1989 | Gardner | 423/65 |
| 4,965,150 | 10/1990 | Dahn et al. | 429/194 |
| 5,277,795 | 1/1994 | Thornhill et al. | 208/251 R |

Primary Examiner—Ngoclan T. Mai
Attorney, Agent, or Firm—Herbert Dubno; Jonathan Myers

[57] ABSTRACT

The starting material is a vanadium-containing residue, which contains at least 5 weight percent carbon on an anhydrous basis. The residue is thermally treated in a furnace a) at temperatures from 400° to 700° C. under an oxidizing atmosphere and an $O_2$ partial pressure of at least $10^{-4}$ bar, measured within the region which is occupied by the residue, and/or b) at temperatures from 500° to 1300° C. under an $O_2$ partial pressure not in excess of $10^{-2}$ bar, measured within the region which is occupied by the residue. A solids mixture which contains at least 5 weight percent vanadium oxide is withdrawn from the furnace. A multiple-hearth furnace or a rotary kiln or a fluidized bed reactor containing a stationary or circulating fluidized bed may be used as a furnace for the thermal treatment.

12 Claims, 1 Drawing Sheet

METHOD OF TREATING A VANADIUM-CONTAINING RESIDUE

FIELD OF THE INVENTION

This invention relates to a method of or process for treating a vanadium-containing residue which on an anhydrous basis contains at least 5 weight percent carbon.

The vanadium-containing residue to be treated may consist of residues which are formed in refineries particularly petroleum coke or high-asphalt residues. Another example of such a residue is carbon black which has been formed by the partial oxidation of hydrocarbons and collected, e.g., as carbon black water in the coarse purification of a raw gas produced by partial oxidation.

DE-A-40 03 242 describes the utilization of carbon black water. The carbon black water is mixed with sewage sludge and the mixture is dewatered and incinerated. The vanadium-containing ash thus formed is placed on a dump.

OBJECT OF THE INVENTION

It is an object of the invention to provide a method or process which affords recovery a high-vanadium solids mixture which can be used in metallurgical processes.

SUMMARY OF THE INVENTION

This object is achieved in accordance with the invention in that the residue is thermally treated in a furnace
 a) at a temperature of 400° to 700° C. under an oxidizing atmosphere and an $O_2$ partial pressure of at least $10^{-4}$ bar, measured within the region which is occupied by the residue, and/or
 b) at a temperature of 500° to 1300° C. under an $O_2$ partial pressure not in excess of $10^{-2}$ bar, measured within the region which is occupied by the residue, and a solids mixture that contains at least 5 weight percent vanadium oxide is withdrawn from the furnace.

These process conditions avoid the production of $V_2O_5$ in disturbing quantities, which would cause agglomerates and crusts to be formed in the furnace at temperature above 700° C.

It has been found that the processing at temperatures in the range from 50° to 1300° C. and under an $O_2$ partial pressure not in excess of $10^{-2}$ bar will suppress the formation of $V_2O_5$ and will cause substantially only $VO_2$ to be produced, which does not melt in that temperature range.

The $O_2$ partial pressure must be measured in the region which is occupied by the residue, i.e. in the charge bed. Outside that region, i.e. outside the charge bed, the $O_2$ partial pressure may possibly be higher.

In the temperature range between 500° and 700° C. it is possible to process under condition a) or under condition b), the optimum processing in any given case will be determined by experiments. The processing will preferably be carried out at such a temperature or temperatures which is or are required in view of the reactivity of the carbon in the residue or by the residual carbon content in the resulting solids mixture. The processing results in the elimination of carbon by oxidation.

By means of the process, the combustible components can substantially be removed from various vanadium-containing residues so that an undisturbed low-cost furnace operation will be enabled. It may be desirable to recycle to the furnace at least part of the solids mixture which has been withdrawn from the furnace.

The residues to be treated, particularly solid residues, usually contain at least 20 weight percent combustible components in their solids content and contain at least 5 weight percent carbon. In that case the thermal treatment in accordance with the invention can be carried out in a simple manner, usually with the need for additional fuel or in individual cases with additional fuel in only small quantities.

The thermal treatment may be carried out in various types of furnaces. A particularly suitable furnace is a multiple-hearth furnace or a rotary kiln and it is also possible to process the residues in a fluidized bed reactor which contains a stationary or circulating fluidized bed.

Multiple-hearth furnaces, rotary kilns and fluidized bed reactors are known per se. Details have been described in Ullmanns Encyklopädie der technischen Chemie, 4th edition, volume 3, pages 408 to 460.

Advantageously we can add to the residue at least one oxide, hydroxide, carbonate or chloride of one or more of the metals sodium, calcium or iron before or during the thermal treatment. Such an admixture may facilitate the further processing of the solids mixture taken from the furnace in a metallurgical process.

An electric reducing furnace may be mentioned here only as an example of a metallurgical process in which the solids mixture may be processed further, and may be used to produce, e.g. ferro-vanadium, which is required in steelmaking.

The thermal treatment in the furnace may also be facilitated or optimized by an admixture. Besides, the residue may be agglomerated before the thermal treatment with or without any of the above-mentioned admixtures to form granules, e.g. by pelletizing or briquetting.

If the residue is contained in waste water, it will be necessary to remove the residue from the waste water, e.g. by filtering or centrifuging, and then to predry the residue before the thermal treatment. Temperatures not in excess of about 400° C. are preferable for predrying because a disturbing formation of dust must be expected at higher temperature.

If the residue is intended to be thermally treated in a multiple-hearth furnace, it is preferable to dry a water-containing residue in the upper region, i.e., in the feed region, of the multiple-hearth furnace.

Alternatively it is possible to use furnaces of two different types and, e.g., to use the multiple-hearth furnace for predrying and a fluidized bed reactor for the subsequent thermal treatment.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
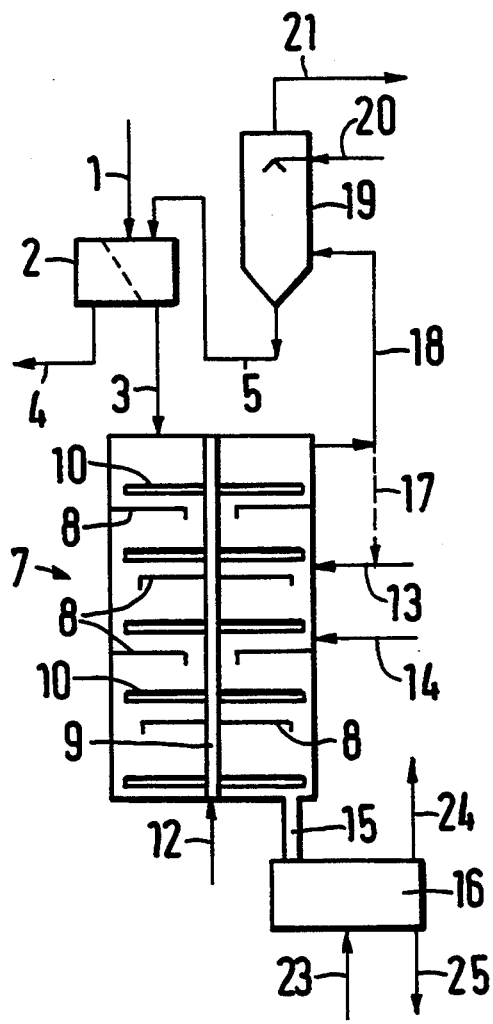
FIG. 1 is a flow diagram which illustrates a first variant of the process, in which a multiple-hearth furnace is employed.

In the process illustrated in FIG. 1 a waste water contains carbon black, a so-called carbon black water, is treated. The carbon black water has been formed by the partial oxidation of hydrocarbons, such as heavy residue oils, to produce a raw gas, which contains mainly hydrogen, carbon oxides, and carbon black. The carbon black is separated by spraying water into the raw gas, the vanadium-containing carbon black being carried off with the water.

The carbon black water is fed through line 1 to filtering means 2, and it may be desirable to add a filtering aid, such as $FeCl_3$, $Ca(OH)_2$, $Al_2(SO_4)_3$, or a polyelectrolyte. The filter cake which is obtained in line 3 is fed to a multiple-hearth furnace 7, known per se. The water from which the carbon black has been removed is withdrawn in line 4.

The multiple-hearth furnace 7 contains numerous superposed plates 8, which are permeable to the solids. Hollow stirrer arms 10 are secured to a vertical hollow tubular shaft 9 and by the rotation of the tubular shaft 9 are moved over the plates 8 to push the solids to the apertures in the plates. Oxygen-containing gas, such as air, flows in line 12 initially into the tubular shaft 9 and is optionally fed as combustion air through the hollow stirrer arms 10 into the desired stories. Each story or level may separately be supplied in case of need with additional air from the outside. That purpose is served by lines 13 and 14 shown in the drawing.

The water-containing solid residue coming from line 3 is initially dried in the upper region of the multiple-hearth furnace 7 and is subsequently subjected in the underlying stories or levels at increasing temperatures to combustion and gasifying reactions, by which the carbon content of the residue is substantially consumed. A high-vanadium ash finally leaves the furnace 7 at its lower end through the duct 15 and is cooled in a fluidized bed cooler 16 with fluidizing air from line 23. Exhaust air is withdrawn in line 24 and may optionally by supplied to the wet scrubber 19. A cooled solids mixture, which contains vanadium oxide, is available in line 25 for further use.

The processing in the multiple-hearth furnace 7 is carried out at temperatures from 400° to 700° C. under an oxidizing atmosphere and an $O_2$ partial pressure of at least $10^{-4}$ bar or at a temperature in the range from 50° to 1300° C. is carried out under an $O_2$ partial pressure of not in excess of $10^{-2}$ bar. The $O_2$ partial pressure is measured in each case within the bed formed by the solids.

A solids-containing exhaust gas is withdrawn in line 18 and is fed to a wet scrubber 19, such as a venturi scrubber, which is fed with washing water through line 20. The solids-containing washing water is fed in line 5 to the filtering means 2. The exhaust gas is withdrawn from the scrubber 19 in line 21 and may be supplied to an afterburner, not shown, particularly if CO is contained in the exhaust gas.

The control means required for the operation of the multiple-hearth furnace 7 include temperature sensors and start-up burners and are known per se and for this reason are not illustrated for the sake of simplicity. It may be desirable to return part of the exhaust gas to the multiple-hearth furnace in line 17 indicated by a dotted line.

Figure 2:
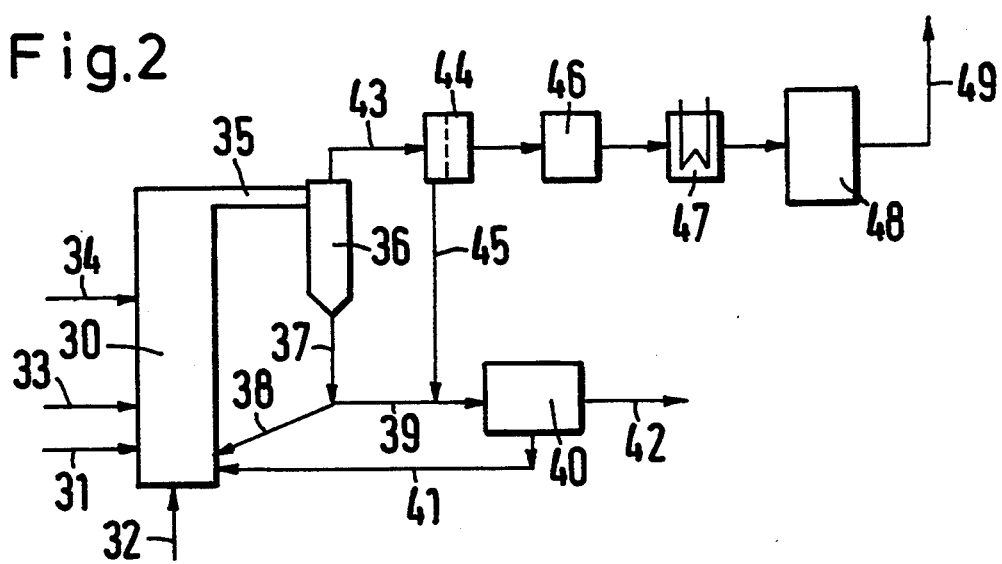
FIG. 2 is a flow diagram of a second variant of the process, in which a circulating fluidized bed is employed.

According to FIG. 2 a vanadium-containing residue, such as petroleum coke, is fed in line 31 to a fluidized bed reactor 30, which contains a fluidized bed of iron oxide granules. Air is supplied to the reactor 30 through line 32, 33 and 34. A gas-solids mixture flows through the duct 35 to a cyclone 36, in which the solids are separated. Part of the solids is recycled to the reactor through lines 37 and 38. The remaining solids are fed in line 39 to a magnetic separator 40, in which the iron oxide is separated and is recycled in line 41 to the reactor 30. The product which becomes available in line 42 consists of a solids mixture that contains vanadium.

The exhaust gas which leaves the cyclone 36 in line 43 is initially treated in a filter 44, which can comprise, porous ceramic elements. Separated solids are fed in line 45 also to the magnetic separator 40. The exhaust gas is then fed to an afterburner 46 and is cooled in a waste heat boiler 47 and is subsequently desulfurized in a unit 48 before it is discharged through the chimney 49 into the atmosphere.

SPECIFIC EXAMPLES

In Examples 1 and 2, a multiple-hearth furnace of the type shown in FIG. 1 is used, which comprises 7 stories and has an inside diameter of 1.1 meters and a total roasting surface of 5.8 $m^2$. The hollow shaft 9 is cooled with air. To heat up the multiple-hearth furnace, flange-mounted natural gas burners are provided in stories 2, 4 and 6, counted from top to bottom. In Example 3, a circulating fluidized bed system of the type shown in FIG. 2 is employed.

In the following Table the compositions (in weight percent) of the solids mixture produced in each example as a product is stated.

|  | Example 1 | Exmaple 2 | Example 3 |
| --- | --- | --- | --- |
| $V_2O_5$ | 75.6 | — | — |
| $VO_2$ | — | 44.3 | 70.8 |
| NiO | 7.6 | 4.6 | 2.2 |
| C (total) | 0.1 | 0.6 | 1.2 |
| S (total) | 0.2 | 0.8 | 0.1 |
| CaO | 1.2 | 0.8 | 0.9 |
| Mgo | 0.7 | 0.5 | 0.6 |
| $Al_2O_3$ | 0.8 | 0.6 | 0.7 |
| $K_2O$ | 1.0 | 0.7 | 1.1 |
| $Na_2O$ | 0.5 | 0.3 | 0.4 |
| $Fe_2O_3$ | 5.6 | — | — |
| $Fe_3O_4$ | — | 41.6 | 14.8 |
| $SiO_2$ | 6.7 | 5.2 | 7.2 |

EXAMPLE 1

An aqueous suspension of carbon black (carbon black water), which has been formed by the scrubbing of a synthesis gas and which contains 1.0 weight percent carbon black, is passed through a filter press. The filter cake is composed of

| | |
| --- | --- |
| water | 80.6 weight % |
| carbon black | 14.5 weight % |
| vanadium | 1.6 weight % |
| nickel | 0.4 weight % |
| others | 2.9 weight % |

The empty furnace is heated up until a temperature of 600° C. is measured in the middle of the furnace., Filter cake is then fed at a rate of 30 kg/h. The start-up burners are operated until a self-sustaining combustion begins when the solids are at a temperature of 550° C. During the self-sustaining combustion of the filter cake, air is supplied to the furnace at a rate of 45 $sm^3$ per hour ($sm^3$=standard cubic meter) and is distributed to the seven stories. At that time the temperature in the middle of the furnace is maintained at 550° to 570° C. Sensors are used to monitor the $O_2$ partial pressure in the charge beds in the various stories. The exhaust gas in line 18 contains about 5 volume percent $O_2$. Part of the exhaust gas is recycled to the furnace. Dedusting is effected by a wet scrubber 19.

EXAMPLE 2

The multiple-hearth furnace is supplied with a mixture of 300 kg filter cake (see Example 1) and 15 kg fine-grained iron ore. After the furnace has been heated up to 750° C., measured in the middle of the furnace, the mixture is supplied to the furnace at a rate of 35 kg/h. The start-up burners are operated to perform a stoichiometric to hypostoichiometric combustion and are shut off, with the exception of the lowermost burner, when a temperature of 800° C. has been reached in the charge bed. Air is supplied to the furnace at a rate of 38 sm$^3$/h. The CO content of the exhaust gas is between 1.1 and 1.5 volume percent and is a measure for the $O_2$ deficiency in the furnace. After the last start-up burner has been shut off, the temperature of 700° to 720° C. is maintained in the middle of the furnace.

EXAMPLE 3

The furnace employed consisted of the fluidized bed reactor 30 shown in FIG. 2 and has an inside diameter of 0.2 meter and a height of 6 m. A waste heat boiler 47 and a desulfurizer 48 are not employed.

Petroleum coke, which contains 57 weight percent ash, is fed by a metering screw feeder to the lower region of the reactor at a rate of 15 kg/h and air for fluidizing and partly combusting the petroleum coke is supplied to the lower, intermediate, and top regions of the reactor. The reactor has previously been provided with inert bed material consisting of granular iron oxide.

Under steady state conditions the oxygen partial pressure in the fluidized bed of the reactor is between $10^{-4}$ and $10^{-6}$ bar and the temperature in the reactor is about 850° C.

Part of the solids collected in the cyclone 36 are withdrawn from the process and supplied to a magnetic separator 40, in which iron oxide is separated. The iron oxide is recycled to the reactor, and the separated solids mixture is obtained as a product having the composition stated in the above table.

We claim:

1. A process for obtaining $VO_2$ by heating a vanadium-containing residue which on an anhydrous basis contains at least 5 weight percent carbon, said vanadium-containing residue selected from the group consisting of refinery residue, petroleum coke residue, asphalt residue, and carbon black residue, which comprises the steps of:
  (a) heating a furnace to a temperature in a range of 500° C. to 1300° C.;
  (b) heating said vanadium-containing residue in the presence of a substoichiometric amount of oxygen in a gaseous atmosphere and in at least one charge bed in said furnace and maintaining a temperature in said charge bed above 700° C.;
  (c) maintaining an $O_2$ partial pressure in said charge bed at said temperature above 700° C. of a maximum of $10^{-2}$ bar to obtain a solids mixture; and
  (d) withdrawing from said furnace as a product, the solids mixture containing at least 5 weight percent $VO_2$, said solids mixture being free of $V_2O_5$.

2. The process defined in claim 1 wherein the vanadium-containing residue is obtained by cooling with sprayed water, a raw gas produced by the partial oxidation of hydrocarbons, to form carbon black water, which is passed through a filter, and a resulting carbon black filter cake is heated according to step (b) as the vanadium-containing residue to the furnace.

3. The process defined in claim 1 wherein following step (d) at least part of the solids mixture withdrawn from the furnace is recycled to the furnace.

4. The process defined in claim 1 wherein at least one oxide, hydroxide, carbonate or chloride of at least one of the metals sodium, calcium or iron is added to the vanadium-containing residue before or during the heating of step (b).

5. The process defined in claim 1 wherein the vanadium-containing residue is agglomerated before the heating of step (b).

6. The process defined in claim 1 wherein the vanadium-containing residue is predried before the heating of step (b).

7. The process defined in claim 1 wherein a multiple-hearth furnace or a rotary kiln or a fluidized bed reactor containing a stationary or circulating fluidized bed is used as the furnace for the heating of step (b).

8. A process for obtaining $VO_2$ by heating a vanadium-containing residue which on an anhydrous basis contains at least 5 weight percent carbon, said vanadium-containing residue
  selected from the group consisting of refinery residue, petroleum coke residue, asphalt residue, and carbon black residue, which comprises the steps of:
  (a) heating a furnace to a temperature in a range of 500° C. to 1300° C.;
  (b) heating said vanadium-containing residue in the presence of a substoichiometric amount of oxygen in a gaseous atmosphere and in at least one charge bed An said furnace and maintaining a temperature in said charge bed of 700° C. to 850° C.;
  (c) maintaining an $O_2$ partial pressure in said charge bed at said temperature of 700° C. to 850° C. at a maximum of $10^{-2}$ bar to obtain a solids mixture; and
  (d) withdrawing from said furnace as a product, the solids mixture containing at least 5 weight percent $VO_2$, said solids mixture being free of $V_2O_5$.

9. The process defined in claim 8 wherein at least one oxide, hydroxide, carbonate or chloride of at least one of the metals sodium, calcium or iron is added to the vanadium-containing residue before or during the heating of step (b).

10. The process defined in claim 9 wherein the vanadium-containing residue is agglomerated before the heating of step (b).

11. The process defined in claim 10 wherein the vanadium-containing residue is predried before the heating of step (b).

12. The process defined in claim 11 wherein a multiple-hearth furnace or a rotary kiln or a fluidized bed reactor containing a stationary or circulating fluidized bed is used as the furnace for the heating of step (b).

* * * * *